Jan. 6, 1953  E. ERNST  2,624,329
KITCHEN RANGE
Filed July 17, 1946
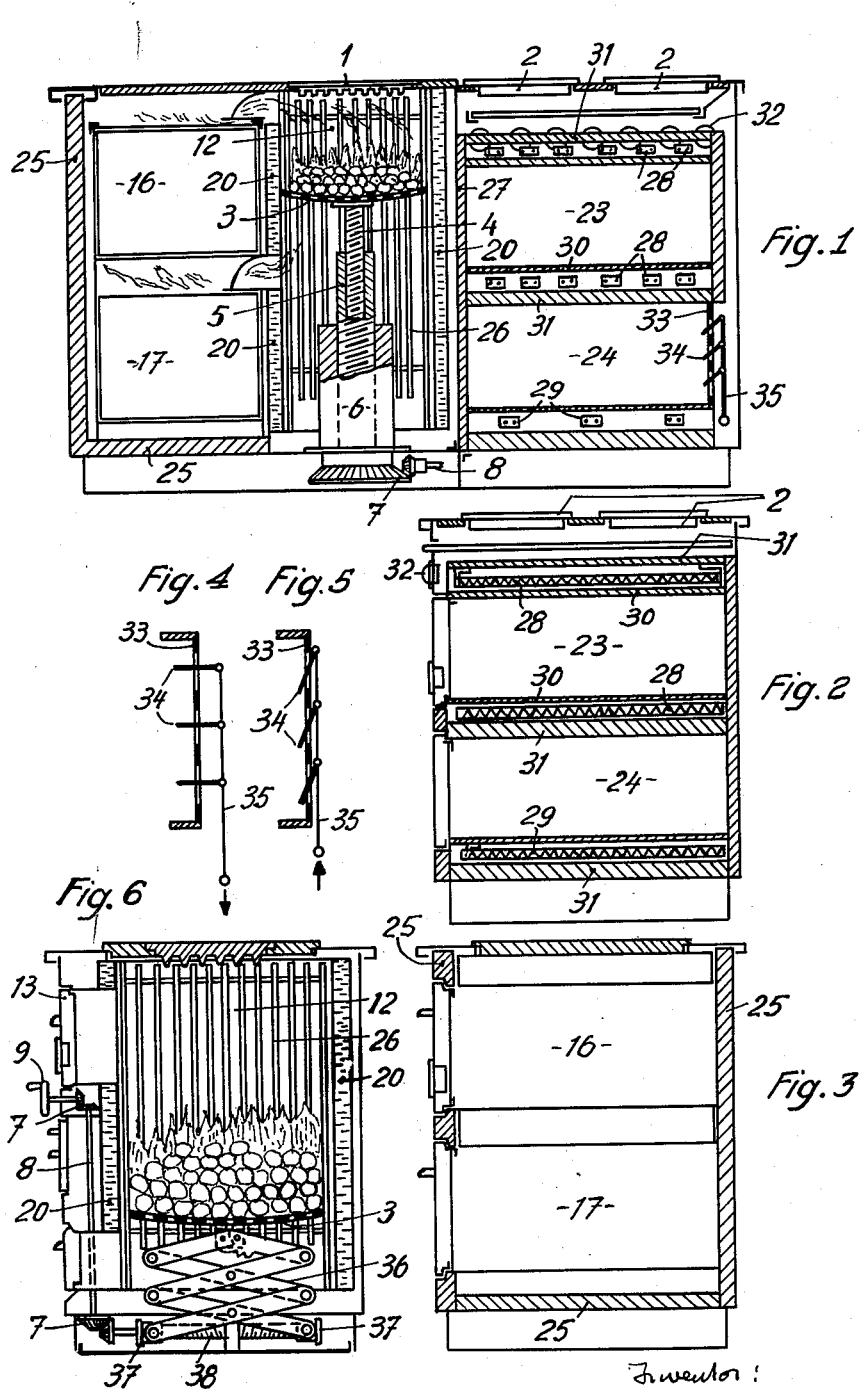

Patented Jan. 6, 1953

2,624,329

UNITED STATES PATENT OFFICE 2,624,329

KITCHEN RANGE

Edouard Ernst, Zurich, Switzerland

Application July 17, 1946, Serial No. 684,327
In Switzerland April 15, 1943

2 Claims. (Cl. 126—34)

This invention relates to kitchen ranges.

Kitchen ranges for the employment of solid fuels as well as kitchen ranges with electric heating are known. The former class of kitchen ranges has, as compared with the latter, the disadvantage that it requires considerably more time for putting it into operation and is, when used for only a brief period, wasteful as regards consumption of fuel. Furthermore, kitchen ranges for solid fuels cause a great heating of the kitchen, which heating is desirable only in the cold season but not in the warm season. Conversely, electrical kitchen ranges have, as compared with kitchen ranges for solid fuels, the disadvantage that their maximum heat output is limited, so that an increase in the heat output, which may be desirable in special cases, is impossible. Electrical cooking ranges have also the disadvantage that they cease to operate when disturbances occur in the mains. It has, it is true, already been proposed to provide a kitchen range with electrical cooking plates which, in case of necessity, can also be heated by wood or coal firing. However, such devices have not proved to be successful, because the electrical cooking plates are, as is known, destroyed after a short time by the wood or coal firing.

The invention is concerned with the problem of providing a kitchen range in which the advantages of the two aforesaid classes of kitchen range are combined, so that the disadvantages of one system or the other are quite inappreciable. According to the invention, this is achieved by virtue of the fact that the range comprises one or more cooking plates that is or are heatable with solid fuels as well as one or more electrical cooking plates or, instead, the same number of gas-heated cooking plates, and that level of the grate which serves for supporting the solid fuel is, during the operation of the range, adjustable by means can be operated from a position on an outer side of the range.

A further feature of the invention lies in the arrangement of a water receptacle which serves for the production of hot water and is arranged around the fire chamber, it being possible to regulate the temperature of the water by altering the level of the grate. The output of heat to heatable chambers that can be employed for baking or heating purposes can be regulated at the same time by this level adjustment. The range comprises, in addition to the electrical cooking plates, one or more electrically heatable chambers that can be employed for baking or heating purposes. A cooling chamber may also be built in.

The portion of the range that is to be heated with solid fuels or the electrical portion of the range can be operated by itself or both portions of the range can be operated at the same time, so that the disadvantages attached to the individual range systems are inappreciable. Owing to the further development of the range for the production of hot water for heating, washing or other purposes, the separate erection of a hot-water producing installation is rendered superfluous.

Examples of embodiments of the kitchen range according to the invention are represented in the accompanying drawings, of which Fig. 1 is a vertical longitudinal section through one embodiment of the range;

Fig. 2 is a vertical cross-section through the electrically heatable part thereof;

Fig. 3 is a corresponding cross-section through the part that is heated by means of solid fuels;

Figs. 4 and 5 show a damper arrangement in the electrically heated part of the range in two different positions and on a larger scale; whilst Fig. 6 is a vertical cross-section through the fire chamber of a second embodiment of the range.

The range shown in Figs. 1 to 5 possesses four electrical cooking plates 2. The outer wall 25 of the range is formed of refractory bricks which, if required, may be covered with enamelled sheet metal. Inside the gire chamber there is located, spaced from the wall formed by the water receptacle 20, a grate which is formed by vertical bars 26. The ends of the bars of the grate 3 engage in the interspaces of the bars of the vertical grate. In this way, on altering the level of the grate 3, the spaces between the bars 26 are cleaned from any pieces of fuel or ashes lodged therein. By the arrangement of the vertical grate, a good draught action is obtained in the fire chamber 12, especially along the walls of the water receptacle 20 and, further, the fuel on the grate 3 is prevented from coming into contact with any condensed water that may be formed on the falls of the receptacle 20. This embodiment of the range is therefore preferably suitable for working with coal, it being possible to use secondary air, which enters below the grate, as combustion air which can arrive into the fire chamber practically unhindered, regardless of whether the fuel resting on the grate is packed tightly or loosely.

The electrical part of the range is separated from the fire chamber 12 by a partition 27 of refractory bricks which lies behind the water receptacle 20. Located beneath the cooking plates 2 is the baking oven 23, which is heatable by electrical heating elements 28, and beneath the baking oven 23 there is located the chamber 24, which is heatable by heating elements 29 and which can be employed as baking or drying tube. The ceiling and the floor of the baking chamber 23 are each formed by a metal plate 30. Above the upper and beneath the lower heating elements there is located an insulation 31 consisting of an asbestos layer and a layer of glass fibres or the like, so that losses of heat by radiation are reduced to a minimum. The heating elements 28 and 29 are connected to a switch, as are also the cooking plates 2, so that the outputs of heat of the individual heating parts can be regulated as desired.

One wall 33 of the heatable chamber 24 is provided with openings which can be partially or completely closed as required by adjustable dampers 34. For this purpose the dampers 34 are hinged to a tie rod 35 and can be rocked into the positions shown in Figs. 4 and 5 or into intermediate positions between these positions, so that the heat in the chamber 24 can be conveniently regulated.

Instead of the grate 3 the level of which is adjustable by means of screw spindles, the grate may, as shown in Fig. 6, be mounted on lazy tongs 36 the two arms of which are each hinged on a guide member 37. These two guide members are mounted on a screw spindle 38 having a right-handed and a left-handed screw thread. The screw spindle 38 can be rotated by means of a hand wheel 9 through bevel wheels 7 and the linkage 8. The two guide members 37 move, according to the direction of rotation, towards each other for the upward movement of the grate 3 or away from each other for the downward movement of the grate.

The driving of the toothed wheels for shifting the grate during the operation can be effected by means of an electromotor which is fitted in the range and can be switched in and out, known means being provided which enable the direction of rotation of the spindles to be reversed, so that the grate can be raised or lowered as required.

In the case of all embodiments of the range, toothed wheels and screw spindles are employed for altering the level of the grate 3 during the operation for the purpose of regulating the heat. This alteration of the level of the grate can, however, be effected with other means, for example hydraulically. For this purpose, the grate may be mounted on a vertical rod which carried a piston that is displaceable in a cylinder. A pressure fluid can be introduced into the cylinder either below or above the piston, according to whether the grate is to be raised or lowered, by means of a pump, with the simultaneous employment of known reversing members.

The possibility of adjusting the level of the grate is of considerable influence on the consumption of fuel. This construction ensures a more economical operation than in the case of the known ranges, so that, owing to the smaller consumption of fuel alone, a rapid paying off is possible.

The heatable chamber 24 with its heating elements 29 may be dispensed with and replaced by a cooling chamber. The refrigerating machine necessary for this purpose can be suspended in the known manner on the ceiling 31. The cooling chamber which, on account of its insulation, cannot be influenced by the operation of the range, can be divided in a suitable manner by horizontal and vertical partitions for accommodating the victuals and drinks that are to be kept cool.

Departures from the embodiments represented and described are possible. In particular, a plurality of cooking plates 1 for heating with solid fuels or a different number of electrical cooking plates 2 than that represented may be provided. Similarly, more than two chambers that can be used for baking or heating purposes may be arranged or the water tank may be dispensed with. Also, instead of the electrical cooking plates, the same number of gas-heated cooking plates may be provided, in which case, naturally, the chambers 23 and 24, which can be used for baking or heating purposes, would be arranged for gas heating.

The expression "a source of heat that can be put into and out of operation instantaneously," which is used in the claims, is meant to cover electrical heating means and also means for heating by gas.

What I claim is:

1. A kitchen range comprising in combination, a cooking surface; a fire grate located beneath said cooking surface, said fire grate having a first side adjacent to said cooking surface and a second side distant from said cooking surface and said fire grate having a plurality of projections located at the outer periphery thereof; means for moving said fire grate toward and away from said cooking surface; a hot water receptacle mounted about said fire grate and spaced therefrom, said receptacle extending from said cooking surface toward said fire grate and extending a substantial distance beyond said second side of said fire grate; a plurality of bars mounted between said grate and receptacle in substantially parallel relation with respect to said receptacle and spaced therefrom, said bars being spaced from each other so as to provide spaces therebetween and said bars also extending from said cooking surface toward said grate and extending a substantial distance beyond said second side of said grate, the said projections of said fire grate extending into said spaces between said bars, whereby said projections, by movement of said grate, remove any material located between said bars so as to prevent the accumulation of such material, and whereby said bars prevent the material being burned on said fire grate from contacting said receptacle.

2. A kitchen range comprising in combination, a cooking surface; a fire grate located beneath said cooking surface, said fire grate having a first side adjacent to said cooking surface and a second side distant from said cooking surface and said fire grate having a plurality of projections located at the outer periphery thereof; means for moving said fire grate toward and away from said cooking surface, said means comprising an externally threaded bolt connected at one end thereof to said second side of said grate and extending in a direction away from said cooking surface and grate, a tubular member having external and internal threads and engaging said bolt with its internal threads, and a rotatably mounted hollow member having internal threads engaging said external threads of said tubular member; a hot water receptacle mounted about said fire grate and spaced therefrom, said receptacle extending from said cooking surface toward said fire grate and extending a substantial distance beyond said second side of said fire grate; a plurality of bars mounted between said grate and receptacle in substantially parallel relation with respect to said receptacle and spaced therefrom, said bars being spaced from each other so as to provide spaces therebetween and said bars also extending from said cooking surface toward said grate and extending a substantial distance beyond said second side of said grate, the said projections of said fire grate extending into said spaces between said bars, whereby said projections, by movement of said grate, remove any material located between said bars so as to prevent the accumulation of such material, and whereby said bars prevent the material being burned on said fire grate from contacting said receptacle.

EDOUARD ERNST.

REFERENCES CITED

The following references are of record in the file of this patent:

UNITED STATES PATENTS

| Number | Name | Date |
|---|---|---|
| 662,827 | Sheppard | Nov. 27, 1900 |
| 1,119,182 | Lucerino | Dec. 1, 1914 |

FOREIGN PATENTS

| Number | Country | Date |
|---|---|---|
| 281,055 | Great Britain | of 1902 |
| 200,017 | Germany | July 7, 1908 |
| 29,062 | Great Britain | of 1909 |
| 461,295 | France | Dec. 24, 1913 |
| 173,289 | Great Britain | Dec. 21, 1921 |
| 642,561 | France | Aug. 31, 1928 |
| 520,365 | Germany | Jan. 5, 1929 |
| 40,311 | Denmark | June 17, 1929 |
| 40,753 | Denmark | Sept. 9, 1929 |